US012387365B1

(12) United States Patent
Barve et al.

(10) Patent No.: US 12,387,365 B1
(45) Date of Patent: Aug. 12, 2025

(54) APPARATUS AND METHOD FOR OBJECT POSE ESTIMATION IN A MEDICAL IMAGE

(71) Applicant: Anumana, Inc., Cambridge, MA (US)

(72) Inventors: Rakesh Barve, Bengaluru (IN); Murali Aravamudan, Andover, MA (US); Suthirth Vaidya, Bengaluru (IN); Animesh Agarwal, San Mateo, CA (US); Deepak Anand, Doddanekundi (IN); Abhijith Chunduru, Bengaluru (IN); Sai Saketh Chennamsetty, Bengaluru (IN); Arjun Puranik, San Jose, CA (US)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/787,196

(22) Filed: Jul. 29, 2024

(51) Int. Cl.
*G06T 7/70* (2017.01)
*G06T 7/00* (2017.01)
*G06T 7/10* (2017.01)
*G06T 7/50* (2017.01)
(Continued)

(52) U.S. Cl.
CPC .............. *G06T 7/70* (2017.01); *G06T 7/0012* (2013.01); *G06T 7/10* (2017.01); *G06T 7/50* (2017.01); *G06T 17/00* (2013.01); *G06V 10/44* (2022.01); *G06T 2207/30021* (2013.01)

(58) Field of Classification Search
CPC ....... G06T 7/0012; G06T 10/50; G06T 10/70; G06T 17/00; G06T 2207/20081; G06T 2207/20084; G06T 2207/30021; G06V 10/44; G06V 10/82; A61B 34/20
See application file for complete search history.

(56) References Cited

U.S. PATENT DOCUMENTS

| 10,363,015 B2 * | 7/2019 | Desjardins ............ A61B 8/4444 |
| 2014/0050375 A1 * | 2/2014 | Baker .................... A61B 34/20 |
| | | 382/128 |
| 2020/0057778 A1 * | 2/2020 | Sun ......................... G06N 3/04 |

(Continued)

FOREIGN PATENT DOCUMENTS

WO    WO-2021099171 A1 *  5/2021  ............. A61B 8/145

OTHER PUBLICATIONS

Yang et al. "Weakly-supervised learning for catheter segmentation in 3D frustum ultrasound." Computerized Medical Imaging and Graphics 96 (2022): 102037. (Year: 2022).*

(Continued)

*Primary Examiner* — Katrina R Fujita
(74) *Attorney, Agent, or Firm* — Caldwell Intellectual Property Law

(57) ABSTRACT

Apparatus and method for object pose estimation are disclosed. The apparatus includes at least a processor and a memory communicatively connected to the at least a processor, wherein the memory contains instructions configuring the at least a processor to receive a plurality of sets of echo data, wherein the plurality of sets of echo data is configured for generation of a plurality of echo depth maps, segment the plurality of echo depth maps, determine a depth datum related to pixels of an object of interest as a function of the plurality of segmented echo depth maps, generate a three dimensional (3D) point cloud related to the object of interest as a function of the depth datum and generate a pose datum of the object of interest as a function of the 3D point cloud.

22 Claims, 8 Drawing Sheets

(51) Int. Cl.
    *G06T 17/00*        (2006.01)
    *G06V 10/44*        (2022.01)

(56) References Cited

U.S. PATENT DOCUMENTS

| | | | | |
|---|---|---|---|---|
| 2020/0315572 | A1* | 10/2020 | Salgaonkar | A61B 8/463 |
| 2021/0378627 | A1* | 12/2021 | Yarmush | A61B 8/466 |
| 2022/0354356 | A1* | 11/2022 | Weeks | G06T 7/0012 |
| 2022/0366594 | A1* | 11/2022 | Meglan | A61B 34/20 |
| 2023/0009831 | A1* | 1/2023 | Troxell | A61B 34/20 |
| 2024/0074738 | A1* | 3/2024 | Kruecker | G16H 30/40 |

OTHER PUBLICATIONS

Chen et al. "Improved 3D catheter shape estimation using ultrasound imaging for endovascular navigation: A further study." IEEE Journal of Biomedical and Health Informatics 24.12 (2020): 3616-3629. (Year: 2020).*

Jian Guan; A Survey of 6DoFObject Pose Estimation Methods for Different Application Scenarios; Published: Feb. 2024; https://www.mdpi.com/journal/sensors.

* cited by examiner

APPARATUS AND METHOD FOR OBJECT POSE ESTIMATION IN A MEDICAL IMAGE

FIELD OF THE INVENTION

The present invention generally relates to the field of medical imaging. In particular, the present invention is directed to an apparatus and method for object pose estimation in a medical image.

BACKGROUND

Currently, one of the most used methods for tracking an "object of interest" in the body uses an intricately placed magnetic sensor on the insertable devices such as magnetic sensor enabled catheters, magnetic sensor enabled intra-cardiac echo catheters. These magnetic sensors make insertable devices costly. These devices are used once in a patient and then disposed of due to the invasive nature of the surgery adding to the cost.

SUMMARY OF THE DISCLOSURE

In an aspect, an apparatus for object pose estimation in a medical image is disclosed. The apparatus includes at least a processor and a memory communicatively connected to the at least a processor, wherein the memory contains instructions configuring the at least a processor to receive a plurality of sets of echo data, wherein the plurality of sets of echo data is configured for generation of a plurality of echo depth maps, segment the plurality of echo depth maps, determine a depth datum related to pixels of an object of interest as a function of the plurality of segmented echo depth maps, generate a three dimensional (3D) point cloud related to the object of interest as a function of the depth datum and generate a pose datum of the object of interest as a function of the 3D point cloud, wherein generating the pose datum includes training a pose estimation model using pose estimation training data, wherein the pose estimation training data includes exemplary 3D point clouds correlated to exemplary pose datums and generating the pose datum using the trained pose estimation model.

In another aspect, a method for object pose estimation in a medical image is disclosed. The method includes receiving, using at least a processor, a plurality of sets of echo data, wherein the plurality of sets of echo data is configured for generation of a plurality of echo depth maps, segmenting, using the at least a processor, the plurality of echo depth maps, determining, using the at least a processor, a depth datum related to pixels of an object of interest as a function of the plurality of segmented echo depth maps, generating, using the at least a processor, a three dimensional (3D) point cloud related to the object of interest as a function of the depth datum and generating, using the at least a processor, a pose datum of the object of interest as a function of the 3D point cloud, wherein generating the pose datum includes training a pose estimation model using pose estimation training data, wherein the pose estimation training data includes exemplary 3D point clouds correlated to exemplary pose datums and generating the pose datum using the trained pose estimation model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for object pose estimation in a medical image are disclosed. The apparatus includes at least a processor and a memory communicatively connected to the at least a processor, wherein the memory contains instructions configuring the at least a processor to receive a plurality of sets of echo data, wherein the plurality of sets of echo data is configured for generation of a plurality of echo depth maps, segment the plurality of echo depth maps, determine a depth datum related to pixels of an object of interest as a function of the plurality of segmented echo depth maps, generate a three dimensional (3D) point cloud related to the object of interest as a function of the depth datum and generate a pose datum of the object of interest as a function of the 3D point cloud, wherein generating the pose datum includes training a pose estimation model using pose estimation training data, wherein the pose estimation training data includes exemplary 3D point clouds correlated to exemplary pose datums and generating the pose datum using the trained pose estimation model. Exemplary embodiments illustrating aspects of the present disclosure are described below in the context of several specific examples.

Figure 1:
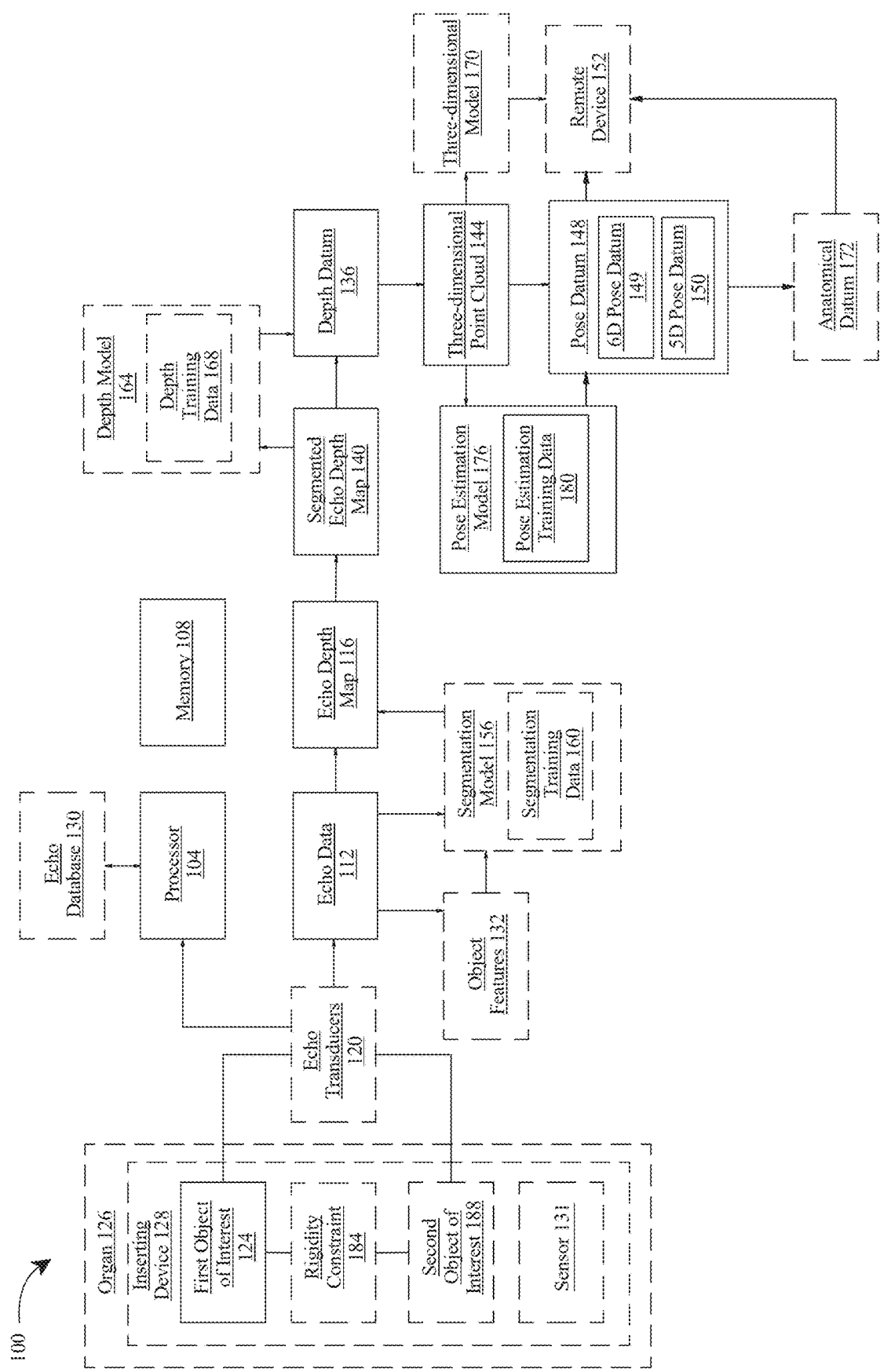
FIG. 1 illustrates a block diagram of an exemplary apparatus for object pose estimation in a medical image.

Referring now to FIG. 1, an exemplary embodiment of an apparatus 100 for object pose estimation in a medical image is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive echo data 112, wherein the echo data 112 is configured for generation of a plurality of echo depth maps 116. For the purposes of this disclosure, "echo data" is data collected by an echo transducer during an imaging process. As a non-limiting example, echo data 112 may include two dimensional (2D) images of an object of interest and surroundings. In some embodiments, receiving a plurality of sets of echo data 112 may include receiving the plurality of sets of echo data 112 from a plurality of echo transducers 120. For the purposes of this disclosure, an "echo transducer" is a device that generates information related to sound waves traveled through various tissues and reflected back when the sound waves encounter an object of interest. As a non-limiting example, echo transducer 120 may include an ultrasound imaging system. In a non-limiting example, the ultrasound imaging system may include a point-of-care ultrasound (POCUS) (e.g., portable ultrasound) or a conventional ultrasound (e.g., ultrasound that a patient must travel to the ultrasound machine). In some embodiments, conventional ultrasound can assess an anatomical region using predefined parameters and measurements to provide a diagnosis while POCUS can assess one part of the body at a time; this may allow user to answer very specific questions in the context of a physical exam and patient history. In some embodiments, each of the plurality of echo transducers 120 may examine and capture echo data 112 of an object of interest 124 in different angles or views; therefore, processor 104 may generate a plurality of echo depth maps 116 that has different angles or views of object of interest 124. In some embodiments, one echo transducer 120 may capture a plurality of sets of echo data 112 of an object of interest 124 in different angles or views. For the purposes of this disclosure, an "object of interest" is a particular element or area within an image, dataset, or scene. As a non-limiting example, object of interest 124 may include specific tissue, cyst, or lumps in an organ 126, implant, inserting devices 128 within an organ 126, and the like. For the purposes of this disclosure, an "organ" is a structure within an organism that is composed of multiple types of tissues and performs a specific function or set of functions. As a non-limiting example, organ may include heart, lung, kidney, liver, stomach, brain, and the like. In some embodiments, the organ 126 may include a cadaveric organ as described below. For the purposes of this disclosure, an "inserting device" is any device that can be inserted into the body. As a non-limiting example, inserting device 128 may include a catheter. For the purposes of this disclosure, a "catheter" is a tube that is inserted into the body to perform a variety of medical procedures. In some embodiments, echo transducers 120 may operate by converting electrical signals into sound waves and vice versa, capturing 2D ultrasound images of an object of interest 124, such as cardiac structures or insertable devices. In some embodiments, inserting device 128 or object of interest 124 may include at least a sensor 131. For the purposes of this disclosure, a "sensor" is a device that produces an output signal for the purpose of sensing a physical phenomenon. As a non-limiting example, sensor 131 may include a location sensor which may be used to locate inserting device 128 or object of interest 124; such as a catheter or implant. In some embodiments, inserting device 128 and/or object of interest 124 may not include a location sensor.

With continued reference to FIG. 1, in some embodiments, echo data 112 may form the basis for generating echo depth maps 116, which can provide information about the relative distances of various points within an object of interest 124 from echo transducer 120. For the purposes of this disclosure, an "echo depth map" is a type of data visualization created using echo data, which provides a representation of the distances from an echo transducer to various points within an object of interest. As a non-limiting example, echo depth map 116 may include gradient colors, shades and contours, and the like. In a non-limiting example, echo depth map may include a 2D image of a catheter (e.g., inserting device 128 and object of interest 124) within a left ventricle of a heart that visualizes spatial relationships and depths of both the heart structures and the inserted catheter.

With continued reference to FIG. 1, in some embodiments, apparatus 100 may include an echo database 130. As used in this disclosure, "echo database" is a data store configured to store data associated with echo data. As a non-limiting example, echo database 130 may store echo data 112, echo depth map 116, object feature 132, depth datum 136, segmented echo depth map 140, three dimensional (3D) point cloud 144, pose datum 148, and the like. In one or more embodiments, echo database 130 may include inputted or calculated information and datum related to echo data 112. In some embodiments, a datum history may be stored in echo database 130. As a non-limiting example, the datum history may include real-time and/or previous inputted data related to echo data 112. As a non-limiting example, echo database 130 may include instructions from a user, who may be an expert user, a past user in embodiments disclosed herein, or the like, where the instructions may include examples of the data related to echo data 112.

With continued reference to FIG. 1, in some embodiments, processor 104 may be communicatively connected with echo database 130. For example, and without limitation, in some cases, echo database 130 may be local to processor 104. In another example, and without limitation, echo database 130 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store echo database 130. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, echo database 130 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described in this disclosure. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, processor 104 may receive echo data 112 from remote device 152. For the purposes of this disclosure, a "remote device" is an external device to a processor 104. As a non-limiting example, remote device 152 may include a laptop, desktop, tablet, mobile phone, smart phone, smart watch, smart headset, or things of the like. In some embodiments, a user may use remote device 152 to input any data into processor 104 or receive or manipulate any data from processor 104. For the purposes of this disclosure, a "user" is any person, individual, organization or entity that is using or has used an apparatus. As a non-limiting example, user may include a physician, clinician, nurses, doctors, medical professionals, hospitals, medical organization, and the like. In some embodiments, remote device 152 may include an interface configured to receive inputs from user. In some embodiments, user may manually input any data into apparatus 100 using remote device 152. In some embodiments, user may have a capability to process, store or transmit any information independently.

With continued reference to FIG. 1, processor 104 may receive echo data 112 using an application programming interface (API). As used in the current disclosure, an "application programming interface" is a software interface for two or more computer programs to communicate with each other. As a non-limiting example, API may include EHR APIs, telemedicine APIs, and the like. An application programming interface may be a type of software interface, offering a service to other pieces of software. In contrast to a user interface, which connects a computer to a person, an application programming interface may connect computers or pieces of software to each other. An API may not be intended to be used directly by a person (e.g., a user) other than a computer programmer who is incorporating it into the software. An API may be made up of different parts which act as tools or services that are available to the programmer. A program or a programmer that uses one of these parts is said to call that portion of the API. The calls that make up the API are also known as subroutines, methods, requests, or endpoints. An API specification may define these calls, meaning that it explains how to use or implement them. One purpose of API may be to hide the internal details of how a system works, exposing only those parts a programmer will find useful and keeping them consistent even if the internal details later change. An API may be custom-built for a particular pair of systems, or it may be a shared standard allowing interoperability among many systems. The term API may be often used to refer to web APIs, which allow communication between computers that are joined by the internet. API may be configured to query for web applications in order to retrieve echo data 112 to another web application, database (e.g., echo database 130), medical center patient portal, and the like. An API may be further configured to filter through web applications according to a filter criterion. In this disclosure, "filter criteria" are conditions the web applications must fulfill in order to qualify for API. Web applications may be filtered based on these filter criteria. Filter criteria may include, without limitation, types of medical facilities, location of the medical facility, and the like.

With continued reference to FIG. 1, memory 108 contains instructions configuring processor 104 to segment a plurality of echo depth maps 116 to generate a plurality of segmented echo depth maps. For the purposes of this disclosure, a "segmented echo depth map" is a depth map that is segmented by different objects or regions. In some embodiments, processor 104 may segment a plurality of echo depth maps 116 to identify a spatial expanse of an object of interest 124. As a non-limiting example, the spatial expanse may encompass all the pixels or points that define the boundaries and interior of the object of interest 124. In a non-limiting example, in a 2D image, this would include all the pixels that make up the object of interest 124, while in a 3D context, it would encompass all the voxels (3D pixels) that constitute the object of interest 124. In some embodiments, segmenting echo depth maps 116 may include extracting object features 132 of object of interest 124 from the plurality of echo depth maps 116 and segmenting the plurality of echo depth maps 116 as a function of the object features 132. For the purposes of this disclosure, an "object feature" is the distinct attributes or characteristics of an object of interest. As a non-limiting example, object feature 132 may include geometric features, such as edges, corners, surfaces, textures, and the like. As another non-limiting example, object feature 132 may include depth value (e.g., depth datum 136 as described below). In some embodiments, processor 104 may extract object feature 132 using a feature extraction model or machine vision system. In another embodiment, processor 104 may generate depth datum 136 without segmenting echo depth map 116.

With continued reference to FIG. 1, in some embodiments, processor 104 may be configured to analyze echo depth map 116 using machine vision system to determine object feature 132. For the purposes of this disclosure, a "machine vision system" is a type of technology that enables a computing device to inspect, evaluate and identify still or moving images. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models 156, such as without limitation by way of machine vision resource (e.g., OpenMV or TensorFlow Lite). A machine vision process may detect motion, for example by way of frame differencing algorithms. A machine vision process may detect markers, for example blob detection, object detection (e.g., object of interest 124), face detection, and the like.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ϕ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, in some embodiments, segmenting a plurality of echo depth maps 116 may include training a segmentation model 156 with segmentation training data 160, wherein the segmentation training data 160 may include exemplary plurality of echo depth maps correlated to exemplary segmented plurality of echo depth maps and segmenting a plurality of echo depth maps 116 using the trained segmentation model 156. For the purposes of this disclosure, a "segmentation model" is a machine learning or deep learning model designed to partition an image into multiple segments or regions, each corresponding to different objects or parts of an object within the image. In some embodiments, segmentation model 156 may assign a label to each pixel in an image (e.g., echo depth map 116) such that pixels with the same label share certain characteristics, such as belonging to the same object of interest 124 or region. As a non-limiting example, segmentation model 156 may include a neural network. For the purposes of this disclosure, "segmentation training data" is data containing correlations that a machine-learning process may use to model relationships between echo depth maps and segmented echo depth maps. In a non-limiting example, a segmentation model 156 may analyze echo depth map 116 to identify and delineate the boundaries of object of interest 124. This may include finding the set of coordinates $\{(X_i, Y_i)\}$ that represent the pixels or voxels making up the object of interest 124. In some embodiments, processor 104 may segment echo depth map 116 based on object feature 132.

With continued reference to FIG. 1, in some embodiments, processor 104 may be configured to generate segmentation training data 160. In a non-limiting example, segmentation training data 160 may include correlations between exemplary echo depth maps, exemplary object features and exemplary segmented echo depth maps. In some embodiments, segmentation training data 160 may be stored in echo database 130. In some embodiments, segmentation training data 160 may be received from one or more users, echo database 130, external computing devices, and/or previous iterations of processing. As a non-limiting example, segmentation training data 160 may include instructions from a user, who may be an expert user, a past user in embodiments disclosed herein, or the like, which may be stored in memory and/or stored in echo database 130, where the instructions may include labeling of training examples. In some embodiments, segmentation training data 160 may be updated iteratively on a feedback loop. As a non-limiting example, processor 104 may update segmentation training data 160 iteratively through a feedback loop as a function of output of feature extraction model, echo data 112, echo depth map 116, and the like. In some embodiments, processor 104 may be configured to generate segmentation model 156. In a non-limiting example, generating segmentation model 156 may include training, retraining, or fine-tuning segmentation model 156 using segmentation training data 160 or updated segmentation training data 160. In some embodiments, processor 104 may be configured to segment echo depth map 116 using segmentation model 156 (i.e. trained or updated segmentation model 156). In some embodiments, echo data 112 or echo depth map 116 may be classified to a user cohort using a cohort classifier. Cohort classifier may be consistent with any classifier discussed in this disclosure. Cohort classifier may be trained on cohort training data, wherein the cohort training data may include echo data 112 or echo depth map 116 correlated to user cohorts. In some embodiments, a user may be classified to a user cohort and processor 104 may determine segmented echo depth map 116 or object feature 132 based on the user cohort and the resulting output may be used to update segmentation training data 160. In some embodiments, generating training data and training machine-learning models may be simultaneous.

With continued reference to FIG. 1, memory 108 contains instructions configuring processor 104 to determine a depth datum 136 related to pixels of an object of interest 124 as a function of a plurality of segmented echo depth maps 140. For the purposes of this disclosure, a "depth datum" is information or value that represents a distance from an echo transducer to a particular point within an object of interest or echo depth map. In a non-limiting example, depth datum 136 may include 20 mm, indicating that the distance from echo transducer 120 to a point on object of interest 124 is 20 millimeters. In another non-limiting example, each pixel in the 2D image (e.g., echo depth map 116 or segmented echo depth map 140) may include an (x, y) coordinate and depth datum 136 (z) can be added to the pixel coordinates to convert them into 3D points (x, y, z). In some embodiments, determining depth datum 136 may include training a depth model 164 using depth training data 168, wherein the depth training data 168 may include exemplary plurality of sets of echo data correlated to exemplary depth datums and determining depth datum 136 using the trained depth model 164. In some embodiments, depth datum 136 may be stored in echo database 130. In some embodiments, processor 104 may retrieve depth datum 136. In some embodiments, user may manually input depth datum 136.

With continued reference to FIG. 1, some embodiments, processor 104 may be configured to generate depth training data 168. In a non-limiting example, depth training data 168 may include correlations between exemplary segmented echo depth maps or exemplary depth maps and exemplary depth datums. In some embodiments, depth training data 168 may be stored in echo database 130. In some embodiments, depth training data 168 may be received from one or more users, echo database 130, external computing devices, and/or previous iterations of processing. As a non-limiting example, depth training data 168 may include instructions from a user, who may be an expert user, a past user in embodiments disclosed herein, or the like, which may be stored in memory and/or stored in echo database 130, where the instructions may include labeling of training examples. In some embodiments, depth training data 168 may be updated iteratively on a feedback loop. As a non-limiting example, processor 104 may update depth training data 168 iteratively through a feedback loop as a function of output of feature extraction model, echo data 112, echo depth map 116, output of segmentation model 156, and the like. In some embodiments, processor 104 may be configured to generate depth model 164. In a non-limiting example, generating depth model 164 may include training, retraining, or fine-tuning depth model 164 using depth training data 168 or updated depth training data 168. In some embodiments, processor 104 may be configured to segment echo depth map 116 using depth model 164 (i.e. trained or updated depth model 164). As a non-limiting example, depth model 164 may include a convolutional neural network (CNN). In some embodiments, depth model 164 may predict depth datum 136 at each pixel. In some embodiments, echo data 112 or echo depth map 116 may be classified to a user cohort using a cohort classifier. Cohort classifier may be consistent with any classifier discussed in this disclosure. Cohort classifier may be trained on cohort training data, wherein the cohort training data may include echo data 112 or echo depth map 116 correlated to user cohorts. In some embodiments, a user may be classified to a user cohort and processor 104 may determine segmented echo depth map 116 or object feature 132 based on the user cohort and the resulting output may be used to update depth training data 168. In some embodiments, generating training data and training machine-learning models may be simultaneous.

With continued reference to FIG. 1, in some embodiments, depth datum 136 related to pixels of object of interest 124 may be determined as a function of segmented echo depth maps 140. In some embodiments, depth model 164 may be trained depth training data 168 including echo 2D or 3D frames and corresponding data from 3D imaging modalities, such as computed tomography (CT), magnetic resonance imaging (MRI), 3D cardiography or electroanatomical mapping (EAM) system. In some embodiments, data from imaging modalities may provide depth datums 136 that can be used as a reference. For the purposes of this disclosure, an "electroanatomical mapping system" is a technology used to create three-dimensional maps using the heart's electrical activity of anatomical structure. In some embodiments, EAM system may include catheters with multiple electrodes to detect electrical signals from different parts of the heart. In some embodiments, EAM system may incorporate mapping software, which processes the electrical signals and positional data (e.g., depth datum 136) to construct and update the electroanatomical maps (e.g., echo depth map 116). These maps are displayed on monitors, allowing clinicians to visualize the heart's activity and structure in great detail. In a non-limiting example, 3D cardiography may use ultrasound equipment to produce detailed three-dimensional images of the heart (e.g., echo data 112), providing precise depth information (e.g., depth datum 136) for each point within the cardiac structures. In another non-limiting example, EAM system may combine electrical signals with anatomical data to create detailed maps (e.g., echo depth map 116) of the heart's structure and function, providing spatial depth information (e.g., depth datum 136) and correlating electrical activity with anatomical features. In some embodiments, processor 104 may determine depth datum 136 using algorithms and techniques that do not rely on machine learning. These methods might include geometric calculations based on echo data 112 and heuristic approaches that use domain-specific knowledge to infer depth. In some embodiments, processor 104 may determine depth datum 136 using self-supervision where the model learns to predict depth datum 136 without data from imaging modalities for each frame; instead, it may use consistency between frames or other implicit signals in the data to guide the learning process. In some embodiments, electroanatomical mapping derived depth (e.g., depth datum 136) can be used as part of depth training data 168; this may utilize the detailed anatomical maps created by EAM to enhance the model's accuracy. To illustrate the application of this process, in a non-limiting example, in an echocardiographic procedure where the goal is to segment the left ventricle and determine its spatial characteristics, echo depth map 116 may be created from echo data 112, showing the distances from echo transducer 120 to various points within the heart. A segmentation model 156 may isolate the left ventricle in the echo depth map 116, and for each pixel in the segmented region (e.g., segmented echo depth map 140), the depth datum 136 may be calculated, providing detailed depth information about the ventricle. The depth model 164, trained on 2D echo frames and data from 3D cardiography or EAM, may predict the depth datum 136 for each pixel, creating a new depth map that accurately represents the left ventricle's structure. This estimated depth map can then be used to create a 3D model of the left ventricle, which can be analyzed for volume, shape, and other characteristics or to generate pose datum 148.

With continued reference to FIG. 1, memory 108 contains instructions configuring processor 104 to generate a three dimensional (3D) point cloud 144 related to object of interest 124 as a function of depth datum 136. In some embodiments, depth datum 136 may be combined with the spatial coordinates of the segmented pixels (e.g., segmented echo depth map 140) to create a 3D point cloud 144. For the purposes of this disclosure, a "three dimensional point cloud" is a collection of data points in space, each represented by its x, y, and z coordinates. In some embodiments, 3D point cloud 144 may capture the geometry of object of interest 124, providing a comprehensive 3D representation. In some embodiments, the construction of 3D point cloud 144 may integrate depth datum 136 from multiple echo frames. In a non-limiting example, when depth datum 136 (z) is added to pixel coordinates to convert them into 3D points (x, y, z), all the 3D points can be aggregated to form 3D point cloud 144.

With continued reference to FIG. 1, in some embodiments, processor 104 may be configured to generate a three dimensional (3D) model 170 as a function of 3D point cloud 144. For the purposes of this disclosure, a "three dimensional model" is a digital representation of an object of interest. As a non-limiting example, Processor 104 may be configured to apply one or more 3D reconstruction algorithms, such as without limitation, marching cubes, contour detection and segmentation, active contour models, and/or the like to create a coherent 3D representation e.g., 3D model 170. In some cases, 3D modeling techniques may include surface modeling, solid modeling, or parametric modeling, among others. As an ordinary person skilled in the art, upon reviewing the entirety of this disclosure, will be aware of various 3D reconstruction algorithms may be used by processor 104 to generate 3D model 170. Additional disclosure related to generating 3D model 170 may be found in Non-provisional application Ser. No. 18/376,688, filed on Oct. 4, 2023, and entitled "APPARATUS AND METHODS FOR GENERATING A THREE-DIMENSIONAL (3D) MODEL OF CARDIAC ANATOMY VIA MACHINE-LEARNING," the entirety of which is incorporated herein by reference.

With continued reference to FIG. 1, memory 108 contains instructions configuring processor 104 to generate a pose datum 148. For the purposes of this disclosure, a "pose datum" is a data element that describes the physical stance, positioning, or orientation of an object in space. In some embodiments, pose datum 148 may include a six degree (6D) pose datum 149. For the purposes of this disclosure, a "six degree pose datum" is a data element that describes an object's position and orientation in three-dimensional space using six parameters: three translational coordinates that indicate the object's location and three rotational coordinates that describe the object's orientation. In some embodiments, pose datum 148 may include a five degree (5D) pose datum 150. A "five degree pose datum," for the purposes of this disclosure, is a data element that describes an object's position and orientation in three-dimensional space using five parameters: three translational coordinates and two rotational coordinates that describe the object's orientation.

In some embodiments, processor 104 may generate a 5D pose datum 150, opposed to a 6D pose datum 149, for objects that are symmetric along one of their axes. For example, a catheter may be symmetric along its longitudinal axis. For this, a 5D pose datum 150 may be determined as it may be difficult or impossible to determine the catheter's rotation about its longitudinal axis. In a non-limiting example, in procedures involving surgical navigation, pose datum 148 may provide information about the position and orientation of surgical instruments (e.g., inserting device 128) relative to the patient's anatomy. During minimally invasive surgeries, accurate pose datum 148 can help surgeons navigate instruments with precision, reducing the risk of damaging surrounding tissues and improving surgical outcomes. For instance, in echocardiographic procedures, knowing the 6D or 5D pose of a catheter tip within the heart may allow for precise targeting of specific cardiac structures, essential for effective interventions. Similarly, accurate pose datum 148 may aid in the diagnosis and treatment planning (e.g., anatomical datum 172) by providing detailed 3D models of organs 126, which can be invaluable for visualizing complex anatomical relationships and planning surgical approaches. In some embodiments, pose datum 148 may be stored in echo database 130. In some embodiments, processor 104 may retrieve pose datum 148 from echo database 130. In some embodiments, user may manually input pose datum 148.

With continued reference to FIG. 1, in some embodiments, processor 104 may determine pose datum 148 using various methods. In some embodiments, processor 104 may determine pose datum 148 using instance-level 6D or 5D pose estimation by determining pose datum 148 of object of interest 124 using pre-existing CAD models. In a non-limiting example, processor 104 may determine pose datum 148 using red, green, and blue (RGB)-based methods using RGB images to estimate pose datum 148 through various techniques. In some embodiments, RGB-based methods may include regression-based methods, template-based methods, feature-based methods, and the like. As a non-limiting example, regression-based methods may include PoseNet, PoseCNN, Deep-6DPose, YOLO-6D, and the like. PoseNet and PoseCNN may use convolutional neural networks (CNNs) to directly regress the pose datum 148 from RGB images. These methods may predict orientation and position without intermediate keypoint representations. These methods may demonstrate the feasibility of deep learning for pose estimation but often require refinement for higher accuracy. Deep-6DPose may extend Mask R-CNN to include a pose prediction branch, simplifying the process and improving efficiency.nYOLO-6D may transform pose estimation into a keypoint regression task using the YOLO framework, offering real-time performance but limited effectiveness in complex environments. As a non-limiting example, template-based methods may include matching the input image with a set of pre-defined templates. SSD-6D and LatentFusion may use deep learning to extend traditional 2D detection networks to 3D pose estimation, leveraging large datasets of 3D shapes to improve generalization to unseen objects. DPOD may combine detection and matching using a dense matching approach, robust to occlusion and lighting changes. As another non-limiting example, feature-based methods may extract distinctive features (e.g., object feature 132) from the image (e.g., echo data 112), such as scale-invariant feature transform (SIFT) or speeded-up robust features (SURF), and may match them to corresponding features on the CAD model. These methods may extract features from images and match them with a 3D model using algorithms like Perspective-n-Point (PnP). PVNet and BB8 can employ segmentation and keypoint voting to handle occlusion and symmetry. EPOS and Pix2Pose can use deep learning to predict pixel-level 3D coordinates, improving robustness to symmetry and occlusion.

With continued reference to FIG. 1, as another non-limiting example, deep learning-based methods may involve training convolutional neural networks (CNNs) (e.g., pose estimation model 176) to directly predict pose datum 148 from RGB images. As another non-limiting example, point cloud or depth-based methods may use 3D point clouds 144 or echo depth maps 116, providing geometric information about the object of interest 124. In a non-limiting example, algorithms like ICP (Iterative Closest Point) may iteratively align the 3D points from the depth sensor with the CAD model by minimizing the distance between corresponding points. These methods can utilize 3D point clouds to infer object pose. PointNet and PointNet++ may be foundational models that process point clouds directly, extracting global and local features for segmentation and classification. PPFNet can combine point-pair features with deep learning to enhance 3D shape retrieval and matching, while PPR-Net integrates instance segmentation and pose estimation for real-time applications. Depth-based methods may convert depth images into point clouds for pose estimation. SwinDePose can use the Swin Transformer for high accuracy by leveraging depth information, handling occlusions effectively. OVE6D can decompose pose estimation into viewpoint, in-plane rotation, and translation tasks, suitable for synthetic training data.

With continued reference to FIG. 1, in some embodiments, processor 104 may determine pose datum 148 using RGB-D-based methods. RGB-D-based methods may include fusion-based Methods. These may combine RGB and depth data to leverage both appearance and geometric information. DenseFusion can extract and fuse features from both modalities, achieving accurate pose estimation through pixel-level voting. MoreFusion can use volumetric maps to represent space occupancy, enabling multi-object pose estimation in occluded scenarios. RGB-D-based methods may include keypoints-based methods. These methods may detect keypoints in objects and establish correspondences for pose prediction. PVN3D can integrate feature extraction, keypoint detection, and semantic segmentation for robust pose estimation in occluded environments. G2L-Net may follow a global-to-local approach, enhancing accuracy by considering rotation residuals and viewpoint perception. GB-D-based methods may include Uni6D that unifies RGB and depth information extraction within a single network framework, achieving high efficiency and approximate accuracy on standard datasets and StablePose that introduces geometric stability for pose estimation, focusing on stable portions of the point cloud to enhance robustness in occluded scenes.

With continued reference to FIG. 1, in some embodiments, processor 104 may determine pose datum 148 using category-level 6D or 5D pose estimation. In some embodiments, category-level 6D or 5D pose estimation may predict the pose datum 148 of object of interest 124 within a category without requiring known CAD models. As a non-limiting example, regression-based methods may directly regress pose datum 148 from input data, utilizing neural networks to map input images (e.g., echo data 112) or 3D point clouds 144 to pose datum 148, using fully connected layers after feature extraction layers to predict the translation and rotation. Regression-based methods may include NOCS that introduces a Normalized Object Coordinate Space for handling different object instances within a category, robustly estimating pose and size through direct regression and DualPoseNet that combines implicit and explicit pose decoders for consistent pose prediction, utilizing spherical fusion to efficiently learn appearance and shape features. As another non-limiting example, prior-based methods may incorporate prior knowledge about object categories to enhance pose estimation. Prior-based methods may include SPD and ACR-Pose that incorporate prior knowledge to handle intra-class variations, employing adversarial training to reconstruct canonical representations for improved estimation accuracy and DPDN that uses a deep prior deformation network to minimize domain gaps with synthetic data, improving sensitivity to pose changes. As another non-limiting example, anchor-based approaches may use a set of anchor poses as references and may refine the predictions based on the nearest anchors. As another non-limiting example, latent space models may learn a compact representation of possible object shapes within a category and predict the pose within this latent space. As another non-limiting example, category-level 6D or 5D pose estimation may further include a method that leverages RGB-D images for single-stage object pose and shape estimation using semantic primitives within a generative model and OnePose that constructs object representations from video scans without requiring CAD models, suitable for real-time applications but challenging with untextured objects.

With continued reference to FIG. 1, in some embodiments, processor 104 may determine pose datum 148 using segmentation-based approaches. In some embodiments, segmentation-based approaches may segment object of interest 124 from the background and occlusions before estimating pose datum 148. In a non-limiting example, estimators like RANSAC can handle outliers and occlusions in the data, ensuring more accurate pose predictions. In some embodiments, sequential models like recurrent neural networks (RNNs) or temporal convolutional networks (TCNs) may maintain consistent pose estimations across frames, leveraging the temporal information to refine predictions. In some embodiments, multi-view approaches, such as multi-view fusion, combine information from multiple views of the object to improve pose accuracy (e.g., a plurality of sets of echo data 112 from a plurality of echo transducers 120 in different angles.

With continued reference to FIG. 1, in some embodiments, processor 104 may determine pose datum 148 using self-supervised or unsupervised learning methods leveraging unlabeled data to learn useful features for pose estimation. Self-supervised learning approaches may use auxiliary tasks, such as predicting future frames or reconstructing the input image, to train pose estimation models 176 without explicit labels. Unsupervised learning methods, including generative models like GANs (Generative Adversarial Networks), may synthesize pose estimation training data 180 or predict pose datum 148 without explicit labels, reducing the dependency on labeled datasets. In some embodiments, hybrid approaches may combine multiple techniques, such as integrating RGB-based and depth-based methods, to leverage the strengths of each approach.

With continued reference to FIG. 1, processor 104 is configured to train a pose estimation model 176 using pose estimation training data 180, wherein the pose estimation training data 180 includes exemplary 3D point clouds correlated to exemplary 6D or 5D pose data and generate pose datum 148 using the trained pose estimation model 176. As a non-limiting example, pose estimation training data 180 may include exemplary 3D point clouds correlated to exemplary 6D pose datums. As a non-limiting example, pose estimation training data 180 may include exemplary 3D point clouds correlated to exemplary 5D pose data. For the purposes of this disclosure, a "pose estimation model" is a machine-learning model that generates a 6D or 5D pose datum. For the purposes of this disclosure, "pose estimation training data" is data containing correlations that a machine-learning process may use to model relationships between a 3D point cloud and 6D or 5D pose datum. In some embodiments, pose estimation model 176 may include a regression model and pose estimation training data 180 may include synthetic 3D point clouds generated from a computer aided design (CAD) model of object of interest 124. For the purposes of this disclosure, a "computer aided design model" is a digital representation of an object created using specialized software that enables the design, visualization, and simulation of products in a virtual environment. For the purposes of this disclosure, a "regression model" is a model used in machine learning or data science to predict a continuous outcome variable (dependent variable) based on one or more predictor variables (independent variables). As a non-limiting example, regression model may include linear regression, polynomial regression, logistic regression, and the like. In a non-limiting example, regression model may be applied to 3D point cloud 144 to estimate pose datum 148, trained on synthetic 3D point clouds and their associated 6D or 5D poses. In some embodiments, rigidity constraints 184 may be applied to ensure that the relative positions and orientations of the cardiac structures remain consistent with anatomical constraints. This step may involve using physical models of the heart's anatomy to guide the pose estimation process.

With continued reference to FIG. 1, some embodiments, processor 104 may be configured to generate pose estimation training data 180. In a non-limiting example, pose estimation training data 180 may include correlations between exemplary segmented echo depth maps or exemplary 3D point clouds and exemplary 6D or 5D pose datums. In some embodiments, pose estimation training data 180 may be stored in echo database 130. In some embodiments, pose estimation training data 180 may be received from one or more users, echo database 130, external computing devices, and/or previous iterations of processing. As a non-limiting example, pose estimation training data 180 may include instructions from a user, who may be an expert user, a past user in embodiments disclosed herein, or the like, which may be stored in memory and/or stored in echo database 130, where the instructions may include labeling of training examples. In some embodiments, pose estimation training data 180 may be updated iteratively on a feedback loop. As a non-limiting example, processor 104 may update pose estimation training data 180 iteratively through a feedback loop as a function of echo data 112, output of feature extraction model, echo data 112, output of depth model 164, output of segmentation model 156, and the like. In some embodiments, processor 104 may be configured to generate pose estimation model 176. In a non-limiting example, generating pose estimation model 176 may include training, retraining, or fine-tuning pose estimation model 176 using pose estimation training data 180 or updated pose estimation training data 180. In some embodiments, processor 104 may be configured to segment echo pose estimation model 176 using pose estimation model 176 (i.e. trained or updated pose estimation model 176). In some embodiments, generating training data and training machine-learning models may be simultaneous.

With continued reference to FIG. 1, in some embodiments, generating pose datum 148 may include generating the pose datum 148 related to a second object of interest 188 relative to object of interest 124 as a function of a rigidity constraint 184 between object of interest 124 and a second object of interest 188. For the purposes of this disclosure, a "second object of interest" is a particular element or area within an image, dataset, or scene other than an object of interest. As a non-limiting example, object of interest 124 may include a catheter and second object of interest 188 may include an electrode on the catheter. For the purposes of this disclosure, an "electrode" is a conductor through which electric current enters or exits a medium. As another non-limiting example, object of interest 124 may include a distinct shape of an inserting device 128, wherein the inserting device 128 may include a catheter and second object of interest 188 may include an electrode within the catheter. For the purposes of this disclosure, a "distinct shape" of an inserting device is a part of the inserting device that has different or recognizable geometric configuration compared to the other parts of the inserting device. For example, and without limitation, a balloon catheter may feature a cylindrical tube with an inflatable balloon (e.g., distinct shape) near the tip. For the purposes of this disclosure, a "rigidity constraint" is a condition imposed on a set of objects or points to ensure that the relative distances between them remain constant over time or transformations. For example, and without limitation, in the case of cardiac structures, the spatial relationships between different parts of the heart may be preserved due to the connective tissue and muscle structure. For example, and without limitation, when estimating pose datum 148 of a rigid body like a catheter within the heart, the distances between electrodes on the catheter may remain constant. For example, and without limitation, inflation balloon part of a balloon catheter and an electrode at a tip of the catheter may have rigidity constraint between them. In some embodiments, rigidity constraint 184 may be stored in echo database 130. In some embodiments, processor 104 may retrieve rigidity constraint 184 from echo database 130. In some embodiments, a user may manually input rigidity constraint 184.

With continued reference to FIG. 1, in some embodiments, processor 104 may be configured to generate an anatomical datum 172 as a function of pose datum 148, wherein the anatomical datum 172 may include a dimension datum of object of interest 124. For the purposes of this disclosure, an "anatomical datum" is a data element that describes anatomical structures and features of a patient. As a non-limiting example, anatomical datum 172 may include information of anatomical features, including shapes, boundaries, and relationships between different structures. For the purposes of this disclosure, a "dimension datum" is a data element about the size or measurements of anatomical structures. As a non-limiting example, dimension datum may include the size and measurements of abnormal tissue masses, cysts, or lumps. For example, and without limitation, dimension datum may include measurements such as volume, surface area, and linear dimensions (length, width, height) of the anatomical structures. These measurements may be used for assessing the extent of abnormalities and planning appropriate medical interventions.

With continued reference to FIG. 1, in some embodiments, generating pose datum 148 may include localizing a rigid catheter (object of interest 124) within a body by finding the position of a known sub-part (second object of interest 188) on the catheter. This sub-part may have fixed distances (rigidity constraint 184) from multiple electrodes on the catheter, which do not change. By determining the 3D coordinate and 6D or 5D pose of the sub-part, the pose datum 148 of all electrodes can be calculated, facilitating the generation of an electro-anatomical map. In some embodiments, generating pose datum 148 may include tracking surgically inserted devices. In a non-limiting example, generating pose datum 148 may aid in tracking surgically inserted devices, such as those used in colonoscopy, to navigate and guide the device to specific locations within the anatomy. The accurate 6D or 5D pose estimation may allow for precise control and monitoring of the device's position and orientation, enhancing the safety and effectiveness of the procedure. In some embodiments, generating pose datum 148 may include size/dimension estimation of abnormal tissue masses (e.g., dimension datum of anatomical datum 172). In a non-limiting example, generating pose datum 148 may allow processor 104 to estimate the size and dimensions of abnormal tissue masses, cysts, or lumps in dense organs 126 such as the liver or breast. By generating 3D point clouds 144 and pose datum 148, clinicians can obtain precise measurements, aiding in diagnosis and treatment planning. The size and dimensions of an abnormal tissue mass can be derived by integrating the volume within the segmented region in the 3D point cloud 144. In some embodiments, generating pose datum 148 may incorporate using point-of-care ultrasound (POCUS) with cadaveric organs that contain artificial objects, such as catheters or implanted elements and generating depth datum 136, pose datum 148, voltage, and the like related to the cadaveric organs. For the purposes of this disclosure, a "point-of-care ultrasound" refers to a use of a portable echo transducer at the patient's bedside or in various clinical settings to quickly diagnose, monitor, and guide treatment. For the purposes of this disclosure, a "cadaveric organ" is an organ that has been removed from a deceased body. In some embodiments, processor 104 may receive echo data 112 that is related to a cadaveric organ from echo transducers 120. This data can be used to build deep learning models and algorithms, reducing the need for animal or human studies to validate medical systems. By systematically varying the positions and orientations (pose datum 148) of the implanted objects (object of interest 124), a diverse and extensive training dataset can be created, enhancing the robustness and accuracy of the developed models.

With continued reference to FIG. 1, processor 104 may be configured to transmit pose datum 148 to a remote device 152 to display pose datum 148, anatomical datum 172, and the like to a user. In some embodiments, at least a processor 104 may be further configured to generate a user interface displaying pose datum 148, 3D model 170, 3D cloud point 144, anatomical datum 172, and the like. For the purposes of this disclosure, a "user interface" is a means by which a user and a computer system interact; for example through the use of input devices and software. In some embodiments, user interface may be displayed on a display device. A "display device," for the purposes of this disclosure, is a device that presents visual information to a user. A display device may include an LCD, CRT, OLED, LED, plasma, and the like. Display device may include a computer monitor, television, and the like. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 104. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

Figure 2:
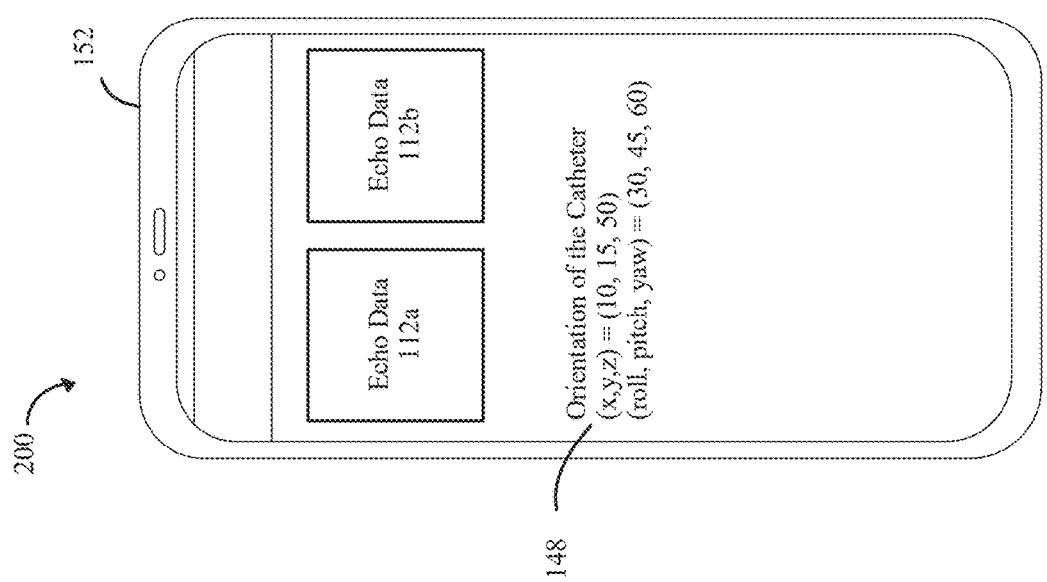
FIG. 2 illustrates a configuration of an exemplary user interface displayed on a remote device.

Referring now to FIG. 2, a configuration of an exemplary user interface 200 of a remote device 152. In some embodiments, user interface 200 may display pose datum 148, a plurality of sets of echo data 112a-b, and the like. As a non-limiting example, plurality of sets of echo data 112a-b may show echo data 112a-b generated by different echo transducers 120 at different angles. As a non-limiting example, as shown in FIG. 2, user interface 200 may display pose datum 148 including shifting the catheter (object of interest 124) along the x, y, and z axes. The x-coordinate, which is 10 mm, indicates that the catheter moves 10 mm to the right of its initial position along the horizontal axis. Next, the y-coordinate, which is 15 mm, signifies that the catheter moves 15 mm upwards along the vertical axis. Finally, the z-coordinate, which is 50 mm, means that the catheter moves 50 mm forward along the depth axis. Additionally, the roll, represented by a 30-degree rotation around the x-axis, indicates how the catheter tilts sideways. The pitch, described by a 45-degree rotation around the y-axis, shows how the catheter tilts upwards or downwards. Finally, the yaw, with a 60-degree rotation around the z-axis, represents how the catheter turns left or right.

Figure 3:
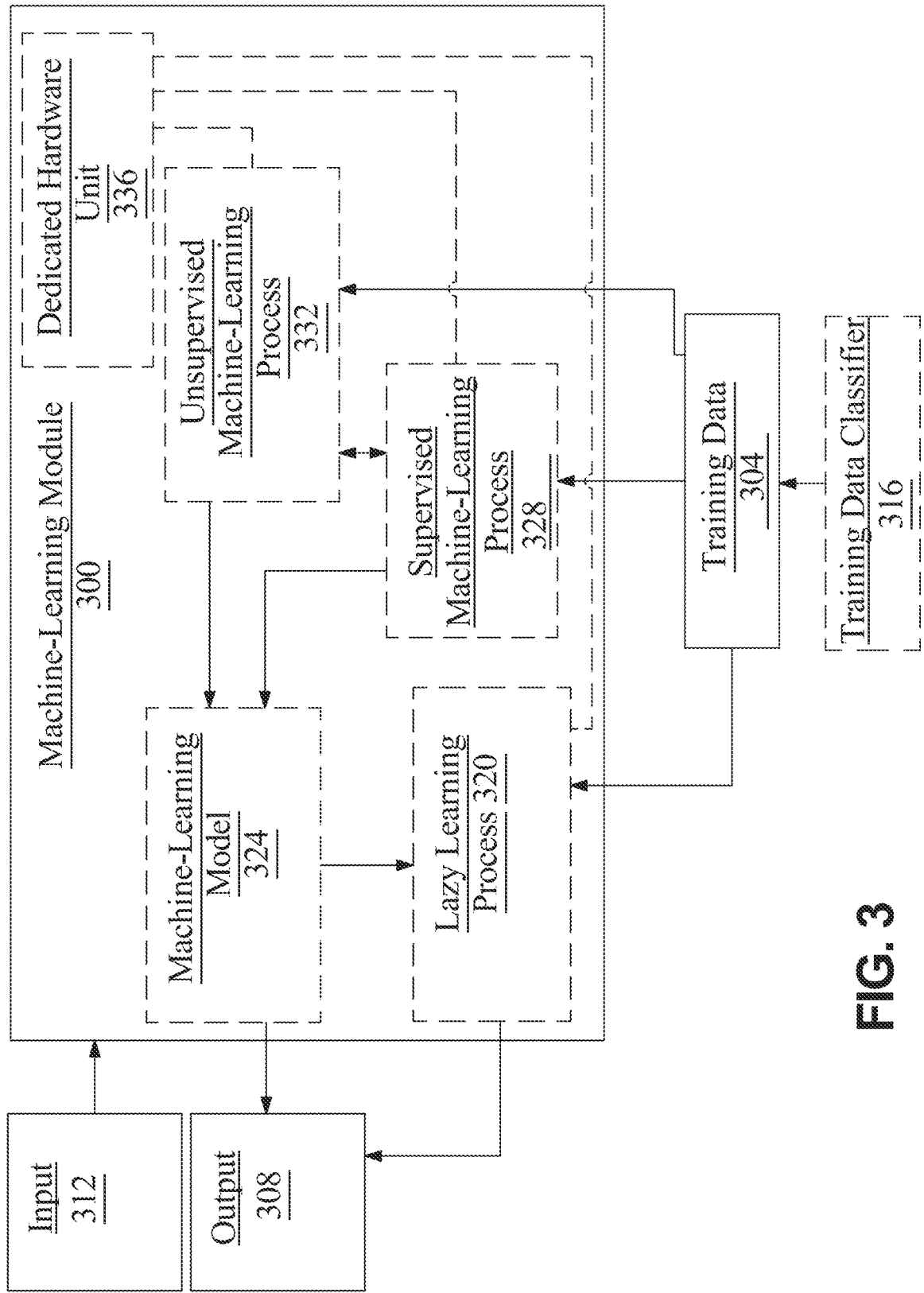
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include echo data 112, echo depth map 116, segmented echo depth map 140, depth datum 136, 3D point cloud 144, object features 132, and the like. As another non-limiting illustrative example, output data may include echo depth map 116, segmented echo depth map 140, depth datum 136, 3D point cloud 144, pose datum 148, object features 132, anatomical datum 172, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to user cohorts. For example, and without limitation, training data classifier 316 may classify elements of training data to user cohorts related to a user's age, weight, existing conditions, surgery, treatment or medication history, gender, and the like.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include echo data 112, echo depth map 116, segmented echo depth map 140, depth datum 136, 3D point cloud 144, object features 132, and the like as described above as inputs, echo depth map 116, segmented echo depth map 140, depth datum 136, 3D point cloud 144, pose datum 148, object features 132, anatomical datum 172, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
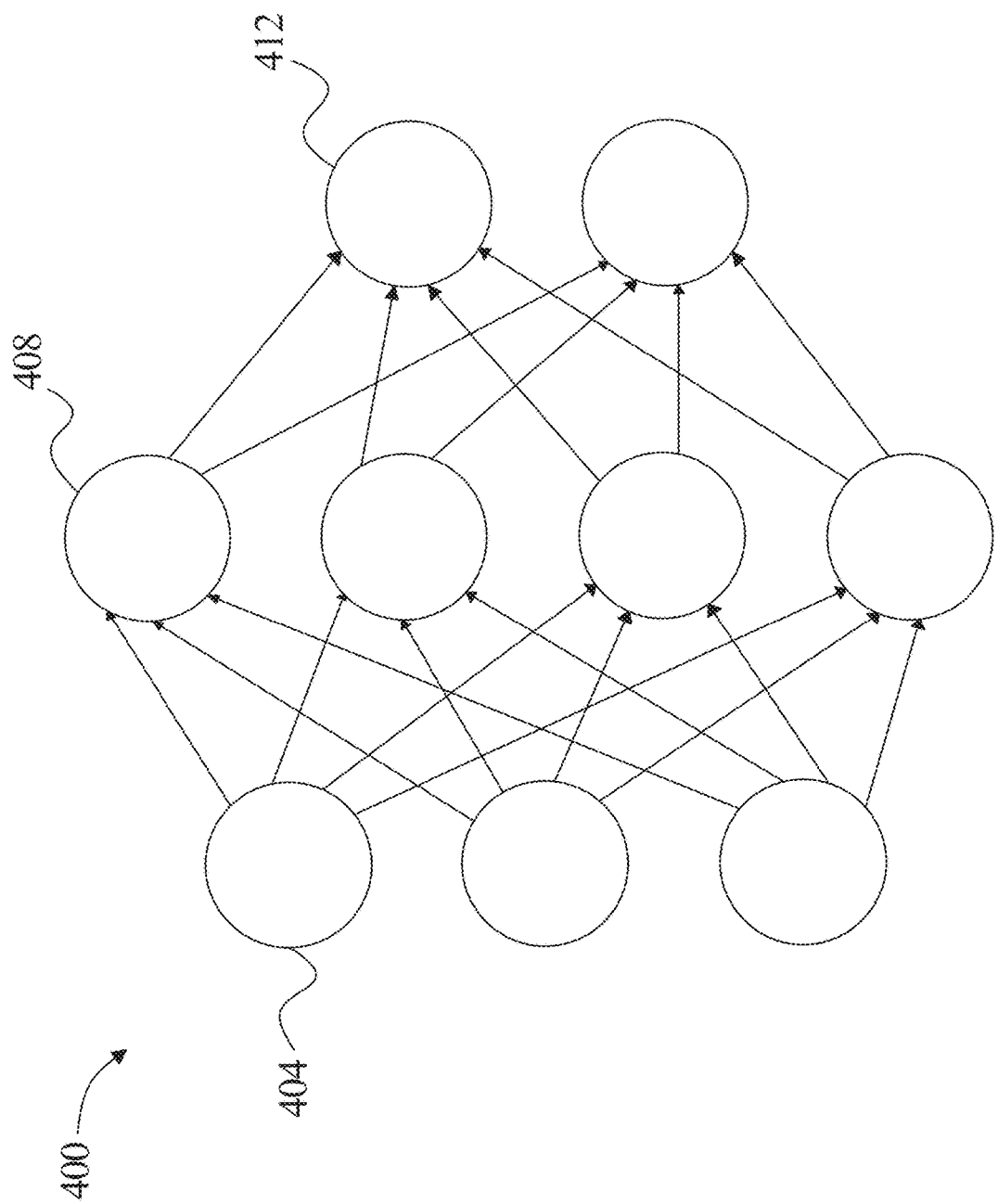
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
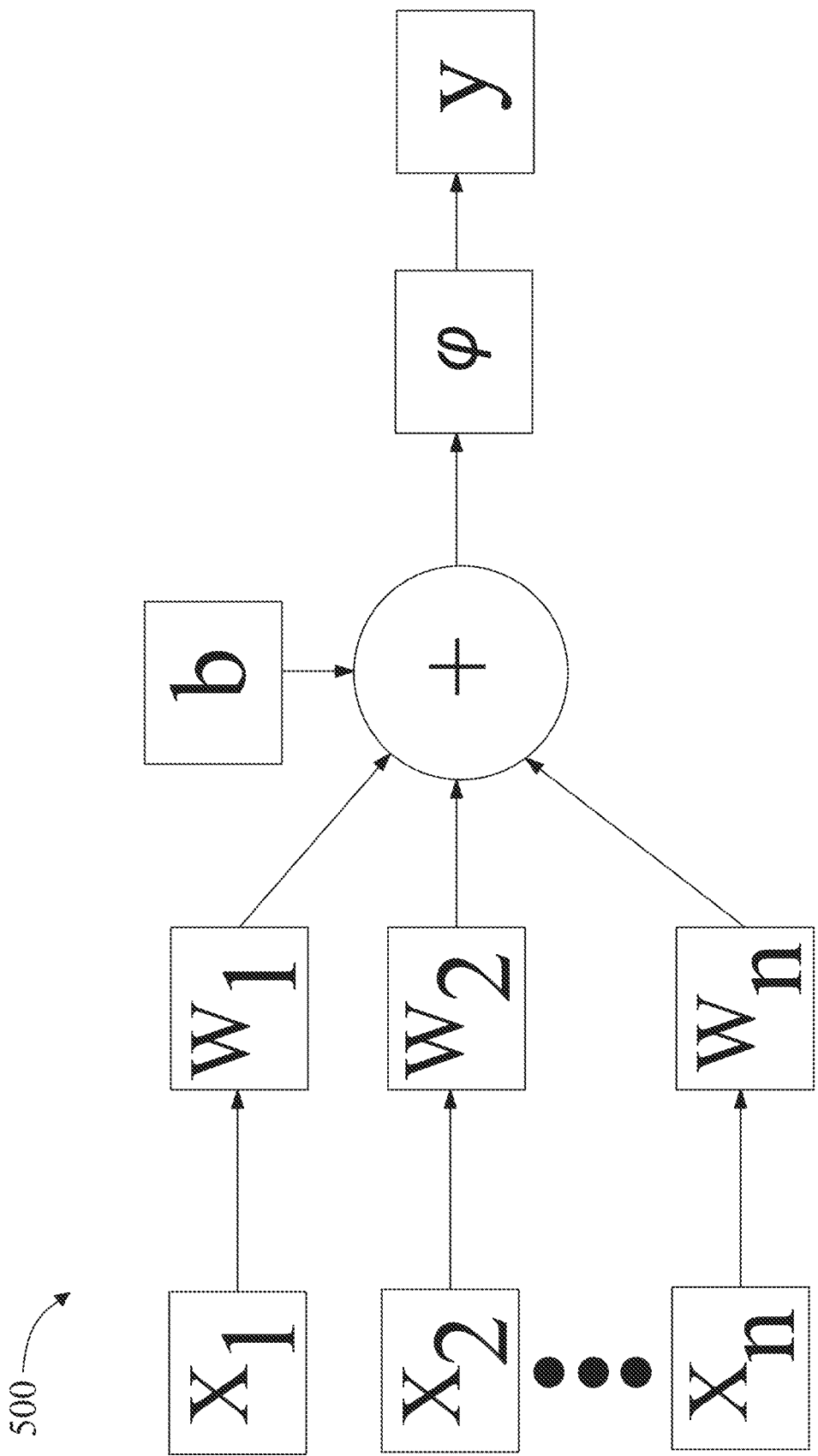
FIG. 5 illustrates a block diagram of an exemplary node in a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - x^{-x}}{e^x + e^{-x}},$$

a tanh derivative function such as f(x)=tanh²(x), a rectified linear unit function such as f(x)=max(0, x), a "leaky" and/or "parametric" rectified linear unit function such as f(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as f(x)=a(1+tanh($\sqrt{2/\pi}$(x+bx'))) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
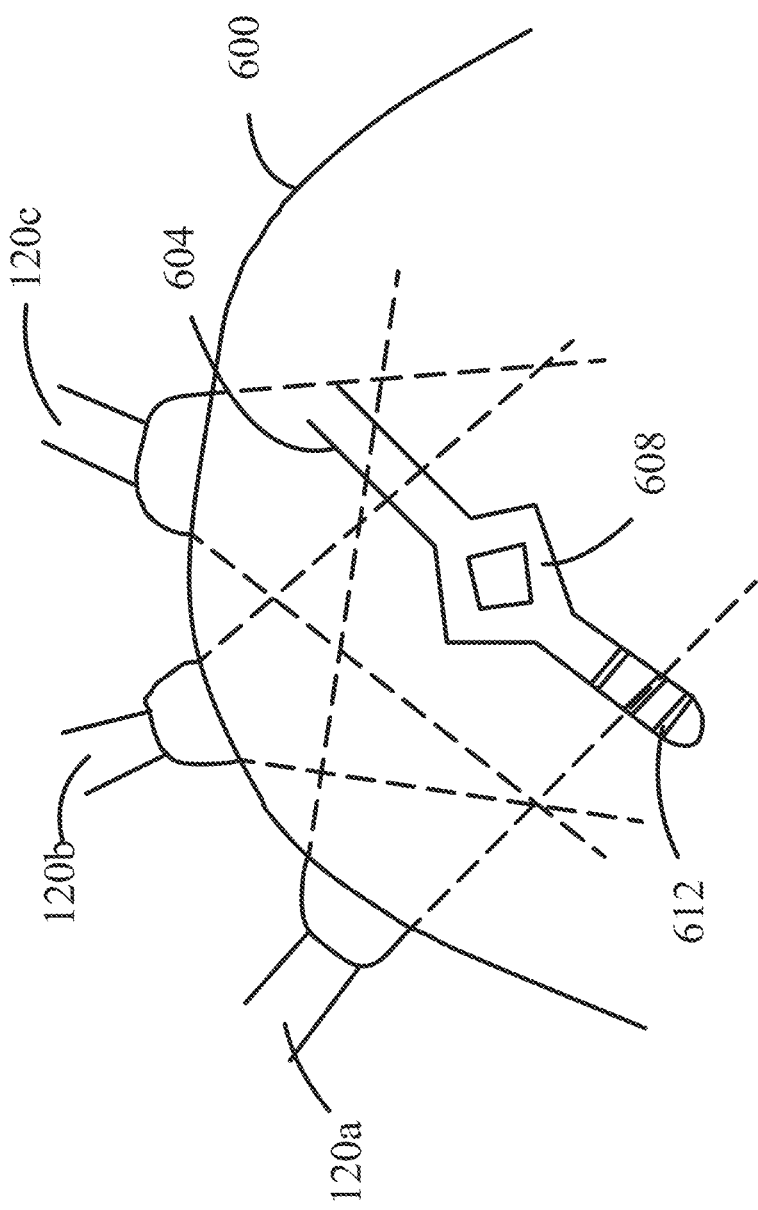
FIG. 6 illustrates a configuration of exemplary echo transducers examining an object of interest within a body.

Referring now to FIG. 6, a configuration of exemplary echo transducers 120*a-c* examining an object of interest 124 and/or second object of interest 188 within a body though a surface of a body 600. As a non-limiting example, echo transducers 120*a-c* may examine object of interest 124 and/or second object of interest 188 through surface of chest, pelvic, abdomen, and the like. In some embodiments, organ within surface of body 600 may include a cadaveric organ. In some embodiments, each of the plurality of echo transducers 120*a-c* may examine and capture a plurality of sets of echo data 112 of an object of interest 124 and/or second object of interest 188 in different angles or views; therefore, processor 104 may generate a plurality of echo depth maps 116 that has different angles or views of object of interest 124 and/or second object of interest 188. In some embodiments, one echo transducer 120 may capture a plurality of sets of echo data 112 of an object of interest 124 and/or second object of interest 188 in different angles or views. In some embodiments, object of interest 124 may include a catheter 604. As another non-limiting example, object of interest 124 may include a distinct shape 608 of a catheter 604 and second object of interest 188 may include an electrode 612 within the catheter 604. For example, and without limitation, a balloon catheter may feature a cylindrical tube with an inflatable balloon (e.g., distinct shape 608) near the tip.

Figure 7:
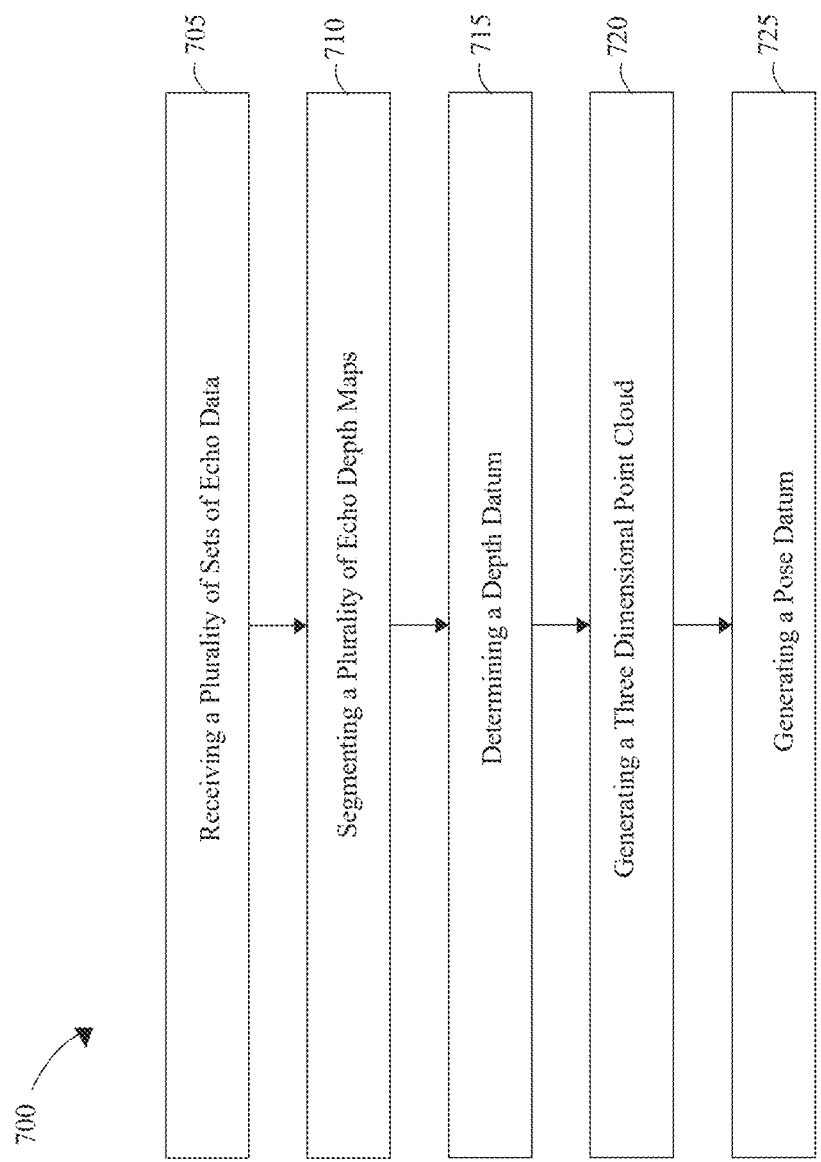
FIG. 7 illustrates a flow diagram of an exemplary method for object pose estimation in a medical image.

Referring now to FIG. 7, a flow diagram of an exemplary method 700 for object pose estimation in a medical image is illustrated. Method 700 contains a step 705 of receiving, using at least a processor, a plurality of sets of echo data, wherein the plurality of sets of echo data is configured for generation of a plurality of echo depth maps. In some embodiments, receiving the plurality of sets of echo data may include receiving the plurality of sets of echo data from a plurality of echo transducers, wherein each of the plurality of echo transducers may be located at a different angle. In some embodiments, the plurality of sets of echo data may be related to a cadaveric organ with an inserting device of a catheter inserted into it. These may be implemented as reference to FIGS. 1-6.

With continued reference to FIG. 7, method 700 contains a step 710 of segmenting, using at least a processor, a plurality of echo depth maps. In some embodiments, segmenting the plurality of echo depth maps may include extracting object features of the object of interest from the plurality of echo depth maps and segmenting the plurality of echo depth maps as a function of the object features. These may be implemented as reference to FIGS. 1-6.

With continued reference to FIG. 7, method 700 contains a step 715 of determining, using at least a processor, a depth datum related to pixels of an object of interest as a function of the plurality of segmented echo depth maps. In some embodiments, determining the depth datum may include training a depth model using depth training data, wherein the depth training data may include exemplary segmented echo depth maps correlated to exemplary depth datums and determining the depth datum using the trained depth model. These may be implemented as reference to FIGS. 1-6.

With continued reference to FIG. 7, method 700 contains a step 720 of generating, using at least a processor, a three dimensional (3D) point cloud related to an object of interest as a function of a depth datum. This may be implemented as reference to FIGS. 1-6.

With continued reference to FIG. 7, method 700 contains a step 725 of generating, using at least a processor, a pose datum of an object of interest as a function of a 3D point cloud, wherein generating the pose datum includes training a pose estimation model using pose estimation training data, wherein the pose estimation training data includes exemplary 3D point clouds correlated to exemplary pose datums and generating the pose datum using the trained pose estimation model. In some embodiments, the pose estimation model may include a regression model and the pose estimation training data may include synthetic 3D point clouds generated from a computer aided design (CAD) model of the object of interest. In some embodiments, generating the pose datum may include generating the pose datum related to a second object of interest relative to the object of interest as a function of a rigidity constraint between the object and the second object of interest. In some embodiments, pose datum may include a 6D pose datum. In some embodiments, pose datum may include a 5D pose datum. In some embodiments, the object of interest of a catheter may include a distinct shape and an electrode of the catheter may include the second object of interest. In some embodiments, method 700 may further include generating, using the at least a processor, a 3D model as a function of the 3D point cloud and generating, using the at least a processor, a user interface displaying the 3D model to a remote device. In some embodiments, method 700 may further include generating, using the at least a processor, an anatomical datum as a function of the pose datum, wherein the anatomical datum may include a dimension datum of the object of interest. These may be implemented as reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
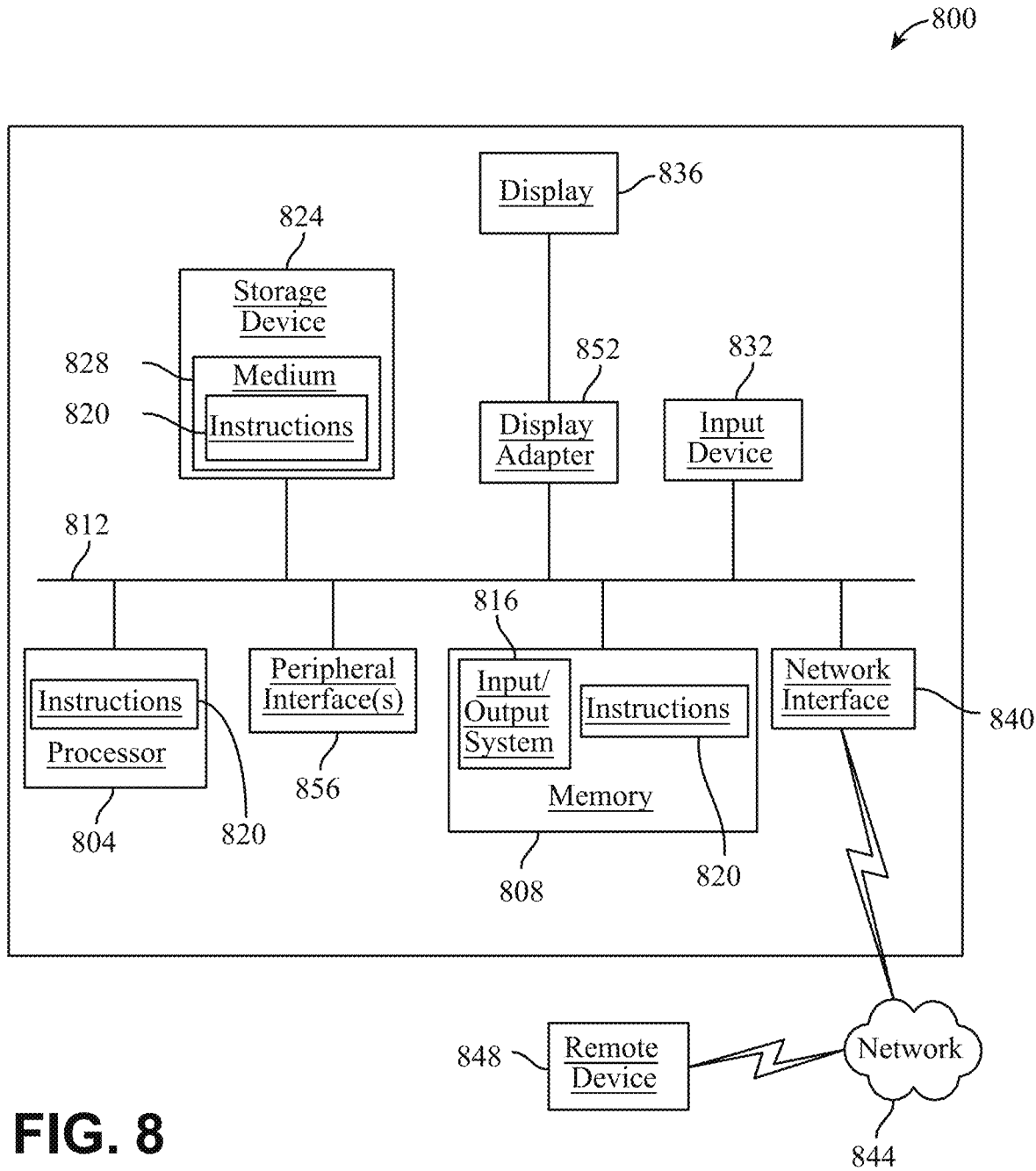
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812. Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for object pose estimation in a medical image, the apparatus comprising:
   one or more ultrasound imaging systems located on a surface of a subject;
   an object of interest configured to be placed within the subject;
   at least a processor; and
   a memory communicatively connected to the at least a processor, wherein the memory contains instructions configuring the at least a processor to:
   receive a plurality of sets of echo data from the one or more ultrasound imaging systems, wherein the plurality of sets of echo data is configured for generation of a plurality of echo depth maps;
   segment the plurality of echo depth maps;
   determine a depth datum related to pixels of the object of interest as a function of the plurality of segmented echo depth maps;
   generate a three dimensional (3D) point cloud related to the object of interest as a function of the depth datum; and
   generate a pose datum of the object of interest as a function of the 3D point cloud, wherein generating the pose datum comprises:
   training a pose estimation model using pose estimation training data, wherein the pose estimation training data comprises exemplary 3D point clouds correlated to exemplary pose datums; and
   generating the pose datum using the trained pose estimation model.

2. The apparatus of claim 1, wherein receiving the plurality of sets of echo data comprises receiving the plurality of sets of echo data from a plurality of echo transducers, wherein each of the plurality of echo transducers is located at a different angle.

3. The apparatus of claim 1, wherein the plurality of sets of echo data is related to a cadaveric organ with a catheter inserted into it.

4. The apparatus of claim 1, wherein segmenting the plurality of echo depth maps comprises:
   extracting object features of the object of interest from the plurality of echo depth maps; and
   segmenting the plurality of echo depth maps as a function of the object features.

5. The apparatus of claim 1, wherein determining the depth datum comprises:

training a depth model using depth training data, wherein the depth training data comprises exemplary segmented echo depth maps correlated to exemplary depth datums; and determining the depth datum using the trained depth model.

6. The apparatus of claim 1, wherein the pose estimation model comprises a regression model and the pose estimation training data comprises synthetic 3D point clouds generated from a computer aided design (CAD) model of the object of interest.

7. The apparatus of claim 1, wherein:
the pose datum comprises a 6D pose datum; and
generating the pose datum comprises generating the 6D pose datum related to a second object of interest relative to the object of interest as a function of a rigidity constraint between the object and the second object of interest.

8. The apparatus of claim 7, further comprising:
a catheter, wherein the catheter comprises:
the object of interest comprising a distinct shape; and
an electrode comprising the second object of interest.

9. The apparatus of claim 1, wherein the memory contains instructions further configuring the at least a processor to:
generate a 3D model as a function of the 3D point cloud;
generate a user interface including the 3D model; and
display the user interface including the 3D model on a display device.

10. The apparatus of claim 1, wherein the memory contains instructions further configuring the at least a processor to generate an anatomical datum as a function of the pose datum, wherein the anatomical datum comprises a dimension datum of the object of interest.

11. The apparatus of claim 1, wherein the pose datum comprises a five degree (5D) pose datum.

12. A method for object pose estimation in a medical image, the method comprising:
placing, one or more ultrasound imaging systems on a surface of a subject;
positioning an object of interest configured to be within the subject;
receiving, using at least a processor and from the one or more ultrasound imaging systems, a plurality of sets of echo data, wherein the plurality of sets of echo data is configured for generation of a plurality of echo depth maps;
segmenting, using the at least a processor, the plurality of echo depth maps;
determining, using the at least a processor, a depth datum related to pixels of the object of interest as a function of the plurality of segmented echo depth maps;
generating, using the at least a processor, a three dimensional (3D) point cloud related to the object of interest as a function of the depth datum; and
generating, using the at least a processor, a pose datum of the object of interest as a function of the 3D point cloud, wherein generating the pose datum comprises:
training a pose estimation model using pose estimation training data, wherein the pose estimation training data comprises exemplary 3D point clouds correlated to exemplary pose datums; and
generating the pose datum using the trained pose estimation model.

13. The method of claim 12, wherein receiving the plurality of sets of echo data comprises receiving the plurality of sets of echo data from a plurality of echo transducers, wherein each of the plurality of echo transducers is located at a different angle.

14. The method of claim 12, wherein the plurality of sets of echo data is related to a cadaveric organ with an inserting device of a catheter inserted into it.

15. The method of claim 12, wherein segmenting the plurality of echo depth maps comprises:
extracting object features of the object of interest from the plurality of echo depth maps; and
segmenting the plurality of echo depth maps as a function of the object features.

16. The method of claim 12, wherein determining the depth datum comprises:
training a depth model using depth training data, wherein the depth training data comprises exemplary segmented echo depth maps correlated to exemplary depth datums; and
determining the depth datum using the trained depth model.

17. The method of claim 12, wherein the pose estimation model comprises a regression model and the pose estimation training data comprises synthetic 3D point clouds generated from a computer aided design (CAD) model of the object of interest.

18. The method of claim 12, wherein:
the pose datum comprises a 6D pose datum; and
generating the pose datum comprises generating the 6D pose datum related to a second object of interest relative to the object of interest as a function of a rigidity constraint between the object and the second object of interest.

19. The method of claim 18, wherein:
the object of interest of a catheter comprises a distinct shape; and
an electrode of the catheter comprises the second object of interest.

20. The method of claim 12, further comprising:
generating, by the at least a processor, a 3D model as a function of the 3D point cloud;
generating, by the at least a processor, a user interface including the 3D model; and
displaying, by the at least a processor, the user interface including the 3D model on a display device.

21. The method of claim 12, further comprising:
generating, using the at least a processor, an anatomical datum as a function of the pose datum, wherein the anatomical datum comprises a dimension datum of the object of interest.

22. The method of claim 12, wherein the pose datum comprises a five degree (5D) pose datum.

* * * * *